US010032364B2

(12) United States Patent
Hamm et al.

(10) Patent No.: US 10,032,364 B2
(45) Date of Patent: Jul. 24, 2018

(54) STANDALONE WIRELESS LIGHTING APPLICATION

(71) Applicant: Savant Systems, LLC, Hyannis, MA (US)

(72) Inventors: Andrew R. Hamm, East Sandwich, MA (US); Kevin C. Kicklighter, Cottonwood, UT (US); Nichol F. Draper, West Jordan, UT (US)

(73) Assignee: Savant Systems, LLC, Hyannis, MA (US)

( * ) Notice: Subject to any disclaimer, the term of this patent is extended or adjusted under 35 U.S.C. 154(b) by 72 days.

(21) Appl. No.: 14/278,385

(22) Filed: May 15, 2014

(65) Prior Publication Data

US 2015/0332586 A1 Nov. 19, 2015

(51) Int. Cl.

*G05B 11/01* (2006.01)
*G08C 17/02* (2006.01)
*H05B 37/02* (2006.01)

(52) U.S. Cl.

CPC ......... *G08C 17/02* (2013.01); *H05B 37/0254* (2013.01); *H05B 37/0272* (2013.01);
(Continued)

(58) Field of Classification Search

CPC ........................... G08C 17/02; G08C 2201/20; G08C 2201/93; H05B 37/0254; H05B 37/025; H05B 37/0272
(Continued)

(56) References Cited

U.S. PATENT DOCUMENTS 5,243,430 A * 9/1993 Emmons ................ H04B 1/202
340/12.22
5,663,990 A * 9/1997 Bolgiano .................. G01S 5/14
375/138
(Continued)

FOREIGN PATENT DOCUMENTS

EP 1263167 A1 12/2002
WO WO-2013/067569 A1 5/2013

OTHER PUBLICATIONS

"INSTEON® Hub: Owner's Manual," INSTEON, Sep. 27, 2013, pp. 1-26.
(Continued)

*Primary Examiner* — Curtis King
(74) *Attorney, Agent, or Firm* — Cesari and McKenna, LLP; James A. Blanchette

(57) ABSTRACT

In one embodiment, a wireless lighting application (app) is executed on a mobile device to configure a wireless lighting control system including a plurality of wireless lighting control devices. A connection is established between the mobile device and a wireless lighting control device. In response to user input in a graphical user interface (GUI) of the wireless lighting app, the wireless lighting app configures at least one of a lighting controller, keypads or lamp modules by at least associating an attached lighting load with a load name. Further, the wireless lighting app defines a lighting scene that uses the lighting load having the load name. Still further, the wireless lighting app assigns the lighting scene to a programmable button of one of the wireless lighting control devices such that, in response to a press of the programmable button, the wireless lighting control system produces the predefined lighting effect.

32 Claims, 12 Drawing Sheets

(52) U.S. Cl.
CPC ..... *G08C 2201/20* (2013.01); *G08C 2201/30* (2013.01); *G08C 2201/93* (2013.01)

(58) Field of Classification Search
USPC ................................................ 340/12.1–12.5
See application file for complete search history.

(56) References Cited

U.S. PATENT DOCUMENTS 5,933,763 A * 8/1999 Wang ................ H04B 7/18532 340/7.22
6,124,804 A * 9/2000 Kitao .................... G08C 19/28 340/12.28
6,895,288 B1 * 5/2005 Shen ................. H05B 37/0263 700/17
7,369,036 B1 * 5/2008 Vacherand .......... G06K 7/0008 340/10.1
7,417,556 B2 * 8/2008 Ling ..................... G08C 17/00 315/314
7,677,753 B1 * 3/2010 Wills ........................ F21S 6/00 362/161
7,737,893 B1 * 6/2010 Furman ................ G01S 5/0215 342/451
8,106,828 B1 * 1/2012 Do ........................ G01S 5/0252 342/451
8,289,137 B1 * 10/2012 Labuda ............... H02J 13/0079 340/13.24
8,417,358 B2 4/2013 Prummel
8,665,744 B2 3/2014 Viswanathan et al.
2003/0107888 A1 * 6/2003 Devlin .................... F21V 21/15 362/233
2004/0226529 A1 * 11/2004 Nantz ................. F02N 11/0807 123/179.2
2005/0288823 A1 * 12/2005 Hesse .................... G05B 15/02 700/276
2006/0076908 A1 * 4/2006 Morgan ............. H05B 33/0842 315/312
2006/0202851 A1 * 9/2006 Cash .................. H05B 37/0272 340/12.23
2007/0293190 A1 * 12/2007 Ota ........................ G08C 17/00 455/404.2
2008/0106382 A1 * 5/2008 Choi .................... G06K 7/0008 340/10.2
2008/0238885 A1 * 10/2008 Zachut ................ G06F 3/03545 345/174
2009/0026978 A1 * 1/2009 Robinson ........... H05B 37/0245 315/294
2009/0051823 A1 * 2/2009 Tsurumoto ............. G08C 17/00 348/734
2010/0029268 A1 2/2010 Myer et al.
2010/0066267 A1 * 3/2010 Meyer .................. H05B 37/029 315/294
2010/0138007 A1 6/2010 Clark et al.
2010/0329689 A1 * 12/2010 Sin ......................... G08C 17/02 398/115
2011/0140832 A1 * 6/2011 Vinkenvleugel ... H05B 37/0272 340/4.2
2011/0279300 A1 * 11/2011 Mosebrook ............ G08C 17/02 341/176
2012/0135692 A1 * 5/2012 Feri ........................ G08C 17/02 455/67.14
2013/0010018 A1 * 1/2013 Economy ........... H05B 37/0272 345/691
2013/0030589 A1 1/2013 Pessina et al.
2013/0043809 A1 * 2/2013 Weaver .............. H05B 37/0272 315/297
2013/0068832 A1 * 3/2013 Li ...................... H05B 37/0272 235/375
2013/0073431 A1 * 3/2013 Suro ...................... G06Q 30/02 705/26.61
2013/0141009 A1 * 6/2013 Jin ..................... H05B 33/0863 315/292
2013/0154820 A1 6/2013 Miller et al.
2013/0257315 A1 * 10/2013 Restrepo ............ H05B 37/0209 315/362
2014/0067147 A1 * 3/2014 Lemke ................. H05B 39/044 700/295
2014/0070707 A1 * 3/2014 Nagazoe .............. H04B 10/116 315/151
2014/0091730 A1 * 4/2014 Kumar ............... H05B 37/0272 315/291
2014/0180487 A1 * 6/2014 Bull ........................ H04L 12/12 700/295
2014/0254477 A1 * 9/2014 Fricke ................... H04W 12/04 370/328
2014/0277805 A1 * 9/2014 Browne, Jr. .............. H02J 4/00 700/295
2014/0376528 A1 * 12/2014 Madonna ........... H05B 37/0272 370/338
2015/0002276 A1 * 1/2015 Kicklighter ........ H05B 37/0254 340/12.5
2015/0257243 A1 * 9/2015 Saffari ............... H05B 37/0272 315/113
2016/0088707 A1 * 3/2016 Van De Sluis .... H05B 37/0227 315/149
2016/0120009 A1 * 4/2016 Aliakseyeu ........ H05B 37/0272 315/131
2017/0094756 A1 * 3/2017 Saffari ............... H05B 37/0272

OTHER PUBLICATIONS

U.S. Appl. No. 13/927,976, filed Jun. 26, 2013 by Kevin C. Kicklighter et al. for a Lighting Controller, pp. 1-22.

U.S. Appl. No. 14/190,984, filed Feb. 26, 2014 by Robert P. Madonna et al. for a User Generated Virtual Room-Based User Interface, pp. 1-32.

"Lutron Catalog vol. 2," Lutron, http://www.luton.com/specificationguide, Nov. 30, 2012, pp. 78-93.

"Invitation to Pay Additional Fees and, Where Applicable, Protest Fees," International Filing Date: May 11, 2015, International Application No. PCT/US2015/030115, Applicant: Savant Systems, LLC., dated Dec. 4, 2015, pp. 1-8.

"Lutron Catalog vol. 2," Lutron, Nov. 30, 2012, pp. 78-93.

"Notification of Transmittal of the International Search Report and the Written Opinion of the International Searching Authority, or the Declaration," International Filing Date: May 11, 2015, International Application No. PCT/US2015/030115, Applicant: Savant Systems, LLC, dated Feb. 9, 2016, pp. 1-23.

"EPO Search Results Under Rule 164(2)(b) EPC," European Application No. 15 725 166.1-1802, Applicant: Savant Systems, LLC, Date of Search: Nov. 16, 2017, dated Nov. 27, 2017, pp. 1-2.

* cited by examiner

STANDALONE WIRELESS LIGHTING APPLICATION

BACKGROUND

Technical Field

The present disclosure relates generally to home automation systems and more specifically to a configuration of a wireless home automation system, such as a Wi-Fi enabled lighting control system.

Background Information

Home automation systems are becoming increasingly popular in both residential and commercial buildings. One type of home automation system is a lighting control system, in which one or more lighting controllers interoperate with user interface devices and dimming and/or switching devices to control various lighting loads distributed about (e.g., inside or outside) a structure (e.g., a home, commercial building, etc.). Using such a lighting control system, a user may control lighting loads in more complex ways than generally possible using conventional mechanical wall switches, to produce complex lighting effects. The potential of such systems has led to their increasingly prevalent use in high-end residential construction and commercial settings. However, a number of shortcomings have hindered their use in budget-constrained residential construction, residential and commercial retrofit applications, and other types of applications.

For example, some home automation systems, and more specifically lighting control systems have often been poorly suited for retrofit applications in older structures whose wiring is difficult to access. Some home automation systems, and more specifically lighting control systems have required lighting loads be wired as separate home runs back to centralized panels associated with the lighting controller. Further, some systems have required additional low voltage wiring (e.g., Cat5 wiring) running from the panels and/or lighting controller itself to user interface devices, such as keypads. Such wiring needs may necessitate expensive rewiring of existing structures.

Further, some home automation systems, and more specifically lighting control systems, have required complicated (and thereby expensive) configuration prior to their first use (and reconfiguration over time to update the system). Such configuration typically is technically involved, requiring the skills of a qualified installer, as well as specialized software and hardware equipment. As such, configuration typically was beyond the capabilities of a homeowner or other layperson.

Accordingly, there is a need for improved techniques for operating and configuring home automation, and more specifically lighting control systems.

SUMMARY

In one embodiment, a wireless home automation system, or more specifically, a wireless (e.g., Wi-Fi enabled) lighting control system utilizes one or more lighting controllers (e.g., Wi-Fi enabled in-wall controller keypads designed to fit within conventional 2-gang in-wall electrical boxes), keypads (e.g., Wi-Fi enabled keypads designed to fit within conventional 1-gang in-wall electrical boxes) and/or lamp modules (e.g., Wi-Fi enabled lamp modules), to dim and/or switch lighting loads about a structure. Collectively, the lighting controllers (e.g., controller keypads), keypads and lamp modules may be referred to as "wireless lighting control devices". The wireless lighting control devices may each include dimming and/or switching circuitry (e.g., dimmers and/or relays) operable to dim and/or switch attached lighting loads. Further, at least some of the wireless lighting control devices may include programmable buttons. The wireless lighting control devices may be configured (via configurations operations) from one or more mobile devices that execute a standalone wireless lighting application (app). After configuration, the programmable buttons, or the standalone wireless lighting app itself, may be utilized to control the wireless lighting control system to produce a lighting effect.

In operation, to configure the wireless lighting control system, a connection is established between the mobile device and one of the wireless lighting control devices (e.g., a controller keypad, keypad, etc.). The connection may be over a wireless network (e.g., a Wi-Fi network) provided by one of the wireless lighting control devices which serves as an access point (AP), or via a wireless network provided by a separate home AP. Alternatively, the connection may be a wired connection, via a connection device that couples a serial communication interface of the mobile device to a serial communication interface of a wireless lighting control device.

The wireless lighting app may present a graphical user interface (GUI) on a touch sensitive screen of the mobile device. In response to user input in the GUI, the wireless lighting app may configure a wireless lighting control device, and the lighting control system in general, by at least associating an attached lighting load with a load name, and, optionally, organizing the lighting load with other lighting loads to form "rooms" and/or "groups." The wireless lighting app may also, in response to user input, define lighting scenes that represent a predefined lighting effect produced by one or more lighting loads set at selected lighting levels. Further, the wireless lighting app may, in response to user input, assign lighting scenes to programmable buttons such that, in response to a press of a programmable button, the wireless lighting control system produces the predefined lighting effect. Thereafter, the user may control lighting by pressing programmable buttons or utilizing the wireless lighting app in a control role to control individual lighting loads, rooms, groups, or lighting scenes It should be understood that a variety of additional features and alternative embodiments may be implemented other than those discussed in this Summary. This Summary is intended simply as a brief introduction to the reader, and does not indicate or imply that the examples mentioned herein cover all aspects of the disclosure, or are necessary or essential aspects of the disclosure.

BRIEF DESCRIPTION OF THE DRAWINGS

The invention description below refers to the accompanying drawings, of which.

DETAILED DESCRIPTION

System Architecture

Figure 1:
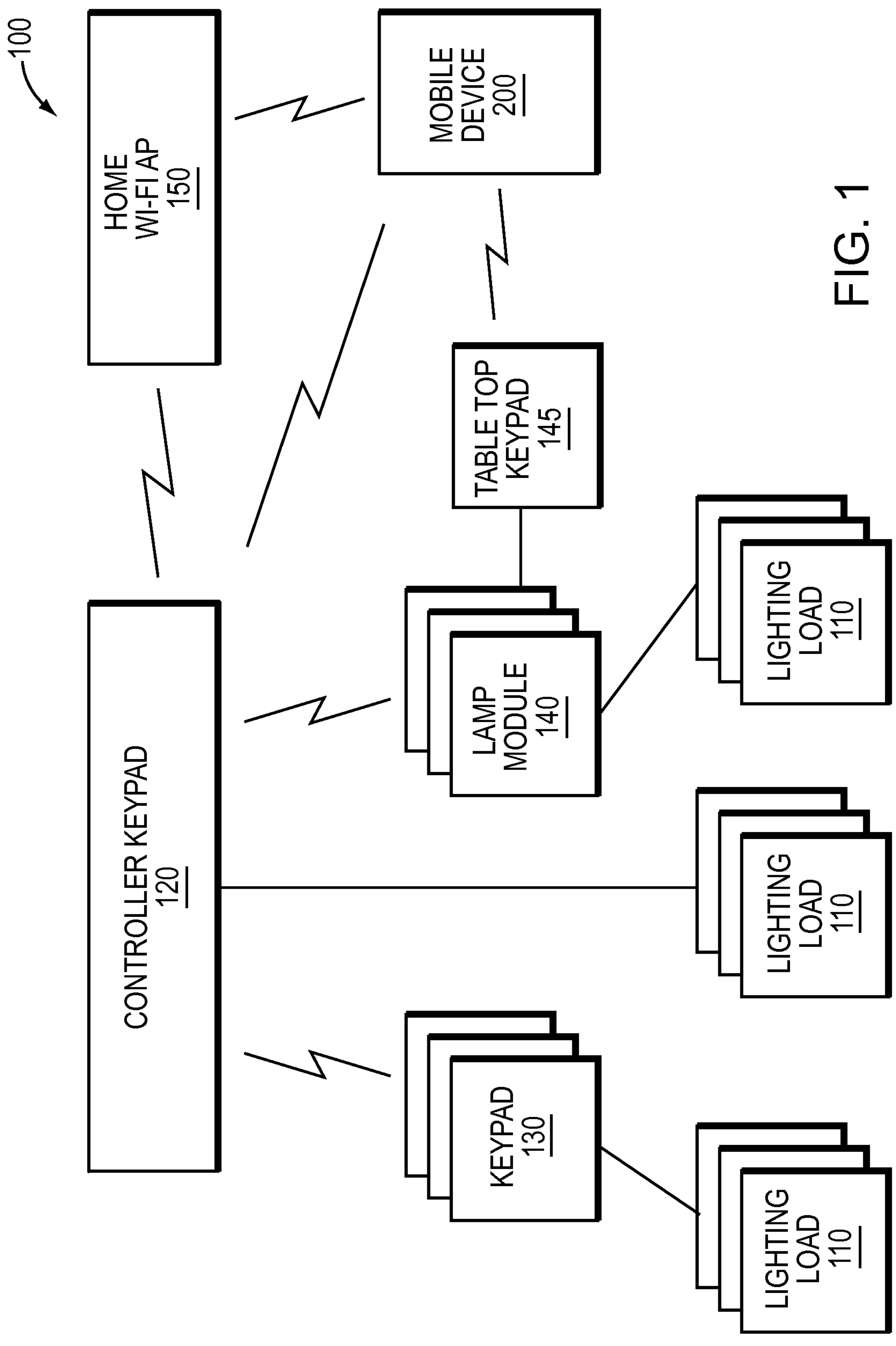
FIG. 1 is a block diagram of an architecture of an example wireless home automation system, or more specifically, an example Wi-Fi based lighting control system capable of switching and/or dimming lighting loads distributed about a structure in response to exchange of Wi-Fi signals between devices of the system.

FIG. 1 is a block diagram of an architecture of an example wireless home automation systems, or more specifically, a Wi-Fi based lighting control system 100 capable of switching and/or dimming lighting loads distributed about a structure in response to exchange of Wi-Fi signals between devices of the system. While a Wi-Fi based system is used in this and certain other examples, it should be understood that the techniques may be readily applied to other wireless technology, for example, Bluetooth, ZigBee, Insteon, etc. As used herein, the term "Wi-Fi" refers to wireless local area network (WLAN) communication that is based on one of the Institute of Electrical and Electronics Engineers' (IEEE) 802.11 standards.

The lighting loads 110 may be light fixtures, lamps, or other types of lighting devices, which are based on incandescent, light emitting diode (LED), halogen, fluorescent, or other lighting technology. While the Wi-Fi based lighting control system 100 is depicted as a standalone system that just handles lighting, it should be understood that the system 100 may be adapted for controlling other types of home automation devices, or may be a part of a larger home automation system that controls other types of home automation devices. For example, a system may control and/or switch data between a variety of types of electronic devices, motor-actuated devices, and/or other types of devices. The electronic devices may include display screens (e.g., televisions) audio/video (a/v) devices, computer devices, or other types of devices utilizing electronics. The motor-actuated devices may include automatic window shades, automatic doors, motorized television lifts, or other type of devices moved by motors. Likewise, the other types of devices may include heating ventilation and air conditioning (HVAC) devices, security devices, or any of a variety of different types of environmental control or monitoring devices.

The Wi-Fi based lighting control system 100 may have at least one Wi-Fi enabled lighting controller, which may take the form of a Wi-Fi enabled in-wall controller keypad 120. In one implementation, the controller keypad 120 has a form factor designed to fit within a 2-gang in-wall electrical box, to simplify retrofit installations. The controller keypad 120 may include a Wi-Fi interface that is capable of forming a Wi-Fi network by operating in an access point (AP) mode, or joining an existing home Wi-Fi network, provided by another Wi-Fi enabled lighting control device operating in an AP mode or a separate home Wi-Fi AP 150. Via the Wi-Fi network, the controller keypad 120 communicates with the other Wi-Fi enabled lighting control devices of the Wi-Fi based lighting control system 100, including any other controller keypads (not shown), keypads 130, and/or lamp modules 140, (collectively referred to as Wi-Fi enabled lighting control devices), as well as mobile devices, such as mobile device 200.

The controller keypad 120 may include terminals (e.g., a pair of terminal sets) used to coupled it to lighting loads, for example, via in-wall wiring. Further, dimming and/or switching circuitry (e.g., a pair of dimmers or a pair of relays) may be provided for dimming and/or switching the attached lighting loads. As discussed in more detail below, the controller keypad 120 may be configured (via configuration operations) to associate each dimmed and/or switched lighting load with a load name, and, optionally, to organized each lighting load with other lighting loads to form "rooms" and/or "groups." In this context, a "room" refers to a collection of lighting loads that are physically proximate to each other, for example, within the same physical room of, or other defined space about, a structure. Similarly, in this context, a "group" refers to lighting loads that share attributes with each other and that may, or may not, be physically proximate to each other. In some cases, "groups" may constitute a collection of "rooms". In other cases, "groups" may be entirely independent of "rooms", for example, constituting a collection of lighting loads that share a common type or function, independent of their physical location. As also discussed in more detail below, one or more selected lighting loads, rooms and/or groups may be associated with selected lighting levels to create "lighting scenes" that represent predefined lighting effects produced by one or more lighting loads set at selected lighting levels. By referring to a "lighting scene" the lighting effect may be specified absent individual adjustment of its constituent lighting loads, rooms and/or groups.

The controller keypad 120 may include a number of programmable buttons (e.g., 2, 4 or 6 buttons) that each may be associated (via further configuration operations) with a lighting scene. In response to a user's press of a programmable button, the controller keypad 120 may change the state of (e.g., turn on, turn off, toggle between on and off, preset to a previous state, dim to a configured level, set a timer, etc.) the lighting scene, by controlling its internal dimmers and/or relays, and/or sending Wi-Fi signals to other controller keypads (not shown), keypads 130, and/or lamp modules 140, to cause them to control their dimmers and/or relays in a manner that produces the predefined lighting effects defined by the lighting scene.

In addition, the controller keypad 120 may include a wired serial communication interface (e.g., a micro universal serial bus (USB) interface) and setup controls, such as an Internet Protocol (IP) reset button operable to reset an IP address used by the controller keypad on the Wi-Fi network, test buttons for testing attached lighting loads, light emitting diodes (LEDs) displaying diagnostics information, a service switch operable to disconnect power from keypad controller 120 and lighting loads to enable testing and service operations, as well as other setup controls.

As mentioned above, the controller keypad 120 may communicate with the keypads 130 via Wi-Fi signals. Such keypads 130 may share some properties of the controller keypad 120, but generally have lesser capabilities. In one implementation, the keypads 130 each have a form factor designed to fit within a 1-gang in-wall electrical box, to simplify retrofit installations. The keypads 130 may each include a Wi-Fi network interface capable of forming a Wi-Fi network by operating as a Wi-Fi access AP, or joining an existing home Wi-Fi network, provided by another Wi-Fi enabled lighting control device or a separate home Wi-Fi AP 150. Like the controller keypad 120, the keypads 130 may each include terminals (e.g., a single set of terminals) used to coupled it to a lighting load, for example, via in-wall wiring. Further, dimming and/or switching circuitry (e.g., a dimmer or a relay) may be provided for dimming and/or switching the attached lighting load. Like the controller keypad 120, each keypad 130 may be configured (via configuration operations) to associate the dimmed and/or switch lighting load with a load name, and, optionally, organized with other lighting loads into rooms and/or groups.

Each keypad 130 may include a number of programmable buttons (e.g., 1, 2 or 3 buttons). Again, like the controller keypad 120, each programmable button may be associated (via further configuration operations) with a lighting scene. In response to a user's press of a programmable button, the keypad 130 may change the state of the lighting scene by controlling its dimmer and/or relay, and/or sending Wi-Fi signals to the controller keypad 120, to trigger it to control its dimmers and/or relays and/or to cause it to signal other keypads 130 and/or lamp modules 140 to instruct them to control their dimmers and/or relays to produce the predefined light effect of the lighting scene. In addition, each keypad 130 may include a wired serial communication interface (e.g., a micro USB interface), as well as setup controls, for example, test buttons, LEDs, a service switch, and other setup controls.

Further, as mentioned above, the controller keypad 120 may communicate with lamp modules 140 via Wi-Fi signals. Each lamp module 140 may include a wall-facing plug for attaching to a wall outlet, and one or more lamp-facing outlets for receiving an electrical cord of a lamp or other lighting load. Dimming and/or switching circuitry (e.g., a dimmer or a relay) may be provided for dimming and/or switching the attached lighting load. Like the controller keypad 120 and the keypads 130, each lamp module 140 may be configured (via configuration operations) to associate the dimmed and/or switched lighting load with a load name, and, optionally, to organize the lighting load with other lighting loads to form "rooms" and/or "groups." The dimming and/or switching circuitry may be controlled in response to received Wi-Fi signals received via a Wi-Fi network interface. The Wi-Fi network interface may be capable of forming a Wi-Fi network by operating as a Wi-Fi access AP, or joining an existing home Wi-Fi network, provided by another Wi-Fi enabled lighting control device or a separate home Wi-Fi AP 150. In addition, the lamp module 140 may include a wired serial communication interface (e.g., a micro USB interface), as well as setup controls, for example, test buttons, LEDs, a service switch, and other setup controls. The lamp module 140 may lack programmable buttons itself. However, it may be coupled (e.g., via a wired connection) to a table top keypad 145 or other device that includes programmable buttons (e.g., 3 buttons). As with the other programmable buttons, these may be associated (via configuration operations) with lighting scenes.

The Wi-Fi enabled lighting control devices 120, 130, 140 may communicate with mobile devices, such as mobile device 200. As used herein, the term "mobile device" refers to an electronic device that is adapted to be transported on one's person and includes a wireless communication interface and a touch sensitive screen. Devices such as tablet computers (e.g., the iPad® tablet available from Apple, Inc.), smartphones (e.g., the iPhone® smartphones available from Apple, Inc., and Android® smartphones available from various suppliers), and certain portable media players (e.g., such as the iPod® touch available from Apple, Inc.), are considered mobile devices. Desktop computers would generally not be considered mobile devices.

The mobile device 200 may be used in a configuration role, to configure the Wi-Fi enabled lighting control devices (e.g., the controller keypad 120, keypads 130 and lamp modules 140) Likewise, the mobile device may be used in a control role, to control individual lighting loads, rooms, groups, or lighting scenes, of an already configured system. When being used in a configuration role, the mobile device 200 may communicate with a Wi-Fi enabled lighting control device via Wi-Fi signals (exchanged over a wireless network provided by a Wi-Fi enabled lighting control device operating as a Wi-Fi AP or by a separate home Wi-Fi AP 150), or via a wired connection. In one implementation, the wired connection may be provided by a connection device that couples a serial communication interface (e.g., a Lightning interface or USB interface) of the mobile device 200 to a serial communication interface (e.g., the micro USB interface) of the Wi-Fi enabled lighting control device. Further details regarding one type of connection device that may be utilized are provided in U.S. patent application Ser. No. 13/923,826 by Madonna et al, titled "A Configuration Connection Device", and filed on Jun. 21, 2013, the contents of which are incorporated by reference herein in their entirety.

When being used in a control role, the mobile device 200 will typically communicate with the Wi-Fi enabled lighting control devices (e.g., via the controller keypad 120), and convey desired state changes to individual lighting loads, rooms, groups or scenes. In response thereto, the Wi-Fi enabled lighting control devices may implement the indicated lighting effects.

Figure 2:
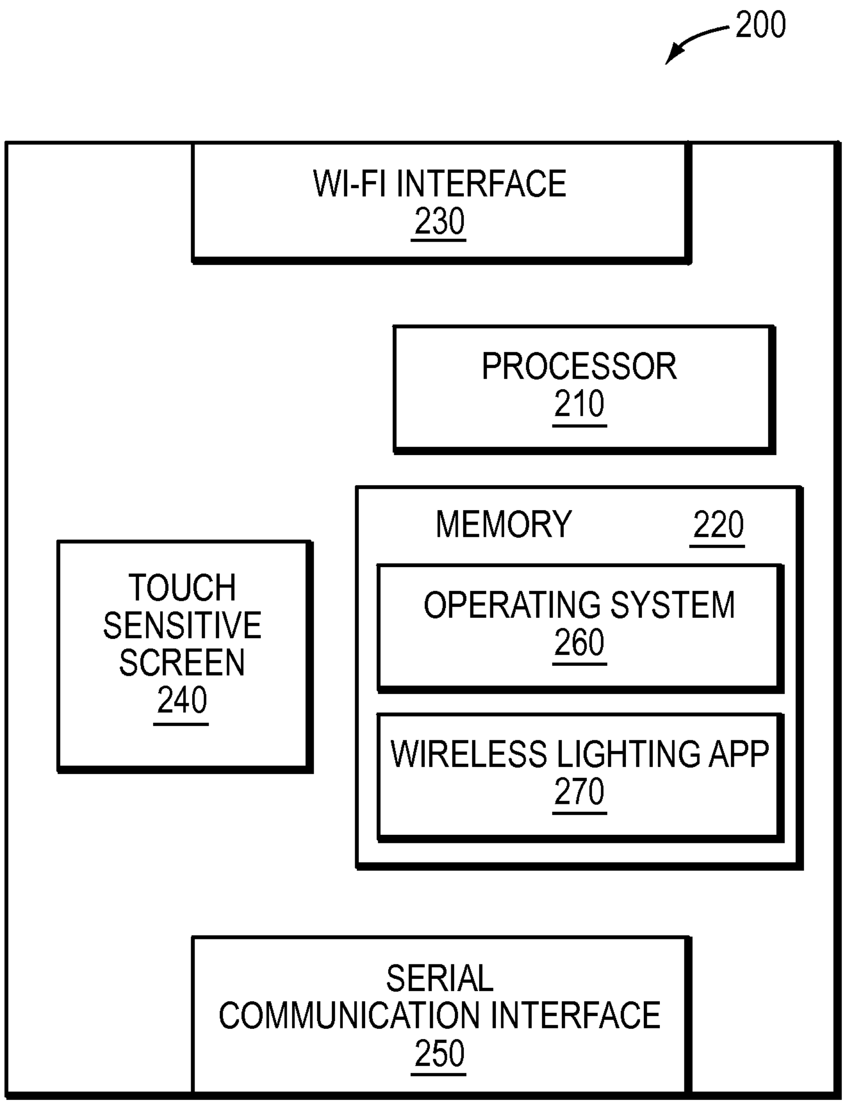
FIG. 2 is a block diagram of an example mobile device that may be used to configure and control a wireless home automation system, or more specifically, an example Wi-Fi based lighting control system.

FIG. 2 is a block diagram of an example mobile device 200 that may be used to configure and control a wireless home automation system, or more specifically, the Wi-Fi based lighting control system 100. The mobile device 200 includes a processor 210, a memory 220, a wireless network interface 230, a touch-sensitive screen 240, a serial communication interface 250, as well as other hardware. The processor 210 includes logic configured to execute software and manipulate data from data structures. The memory 220 includes a plurality of storage locations for storing the software and the data structures. The wireless network interface 230 facilitates communication over one or more wireless networks, for example a Wi-Fi network, a 4G mobile telecommunications network, and/or another type of network. The touch-sensitive screen 240 may receive user input in the form of gestures (e.g., touches, swipes, multi-touch gestures, etc.) from a user. The serial communication interface 250 may be a 30-pin dock interface, a Lightning interface, a USB interface, or another type of interface.

An operating system 260, portions of which are resident in memory 220, functionally organizes the mobile device 200. The operating system 260 may be an IOS® operating system available from Apple, Inc., an Android® operating system available from Google, Inc., or another type of operating system suitable for use on a mobile device. A standalone wireless lighting application (app) 270 that includes a graphical user interface (GUI) may be executed in conjunction with the operating system 260, to permit the mobile device 200 to be used with the Wi-Fi lighting control system, in both a configuration role and a control role.

System Configuration

Figure 3:
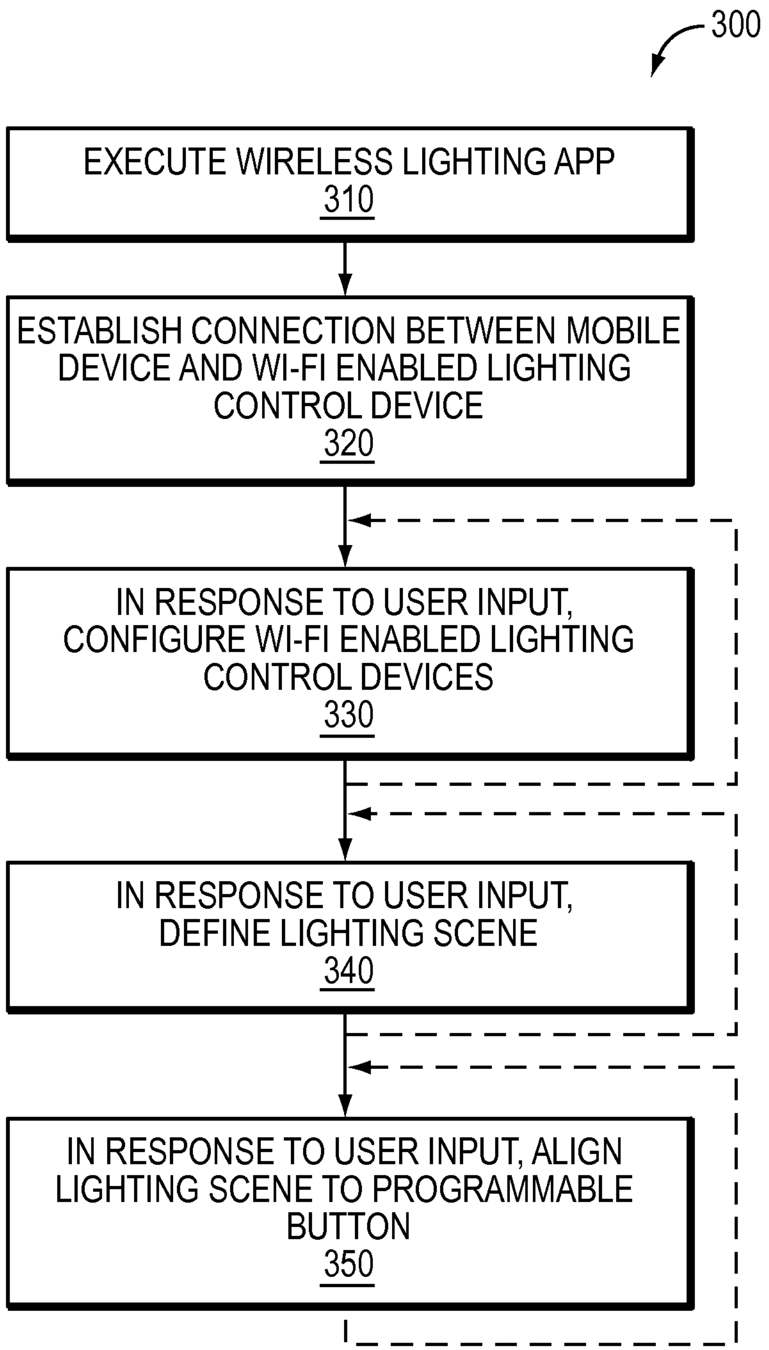
FIG. 3 is a flow diagram of an example sequence of steps that may be executed to configure an example wireless home automation system, or more specifically, an example Wi-Fi enabled lighting control system.

FIG. 3 is a flow diagram of an example sequence of steps 300 that may be executed to configure an example wireless home automation system, or more specifically, the Wi-Fi enabled lighting control system 100. While the steps are shown in a particular sequence, it should be understood that, unless there is an explicitly recited dependency between one step and another, the steps may be executed in various different relative orders.

At step 310, the wireless lighting app 270 is executed by a processor 210 of the mobile device 200. At step 320, a connection is established between the mobile device 200 and a Wi-Fi enabled lighting control device (e.g., a controller keypad). As mentioned above, the connection may be a wireless connection (e.g., over a Wi-Fi network) or a wired connection (e.g., via a connection device). At step 330, in response to user input in the GUI of the wireless lighting app 270, the app 270 configures a Wi-Fi enabled lighting control device, by at least associating an attached lighting load with a load name, and, optionally, organizing the lighting load with other lighting loads to form rooms and/or groups. At step 340, the wireless lighting app 270, in response to user input in the GUI, defines a lighting scene that represents a predefined lighting effect produced by one or more lighting loads set at selected lighting levels. Information regarding the defined scene may be maintained on the keypad controller 120, or elsewhere in the Wi-Fi based lighting control system 100. At step 350, the wireless lighting app 270, in response to user input in the GUI, assigns the lighting scene to a programmable button, such that, in response to a press of the programmable button, one or more Wi-Fi enabled lighting control devices attached to the selected lighting loads dim or switch the lighting loads in a manner to produce the desired lighting effect. Some or all of steps 330-350 may be repeated, to configure additional Wi-Fi enabled lighting control devices, to define additional lighting scenes, and/or to assign additional lighting scenes to additional programmable buttons, until the Wi-Fi lighting control system 100 is fully configured. Thereafter, the sequence of steps 300 may cease. Thereafter, a user is free to control lighting by pressing programmable buttons or utilizing the wireless lighting app 270 on the mobile device 200 in a control role.

Figure 4A:
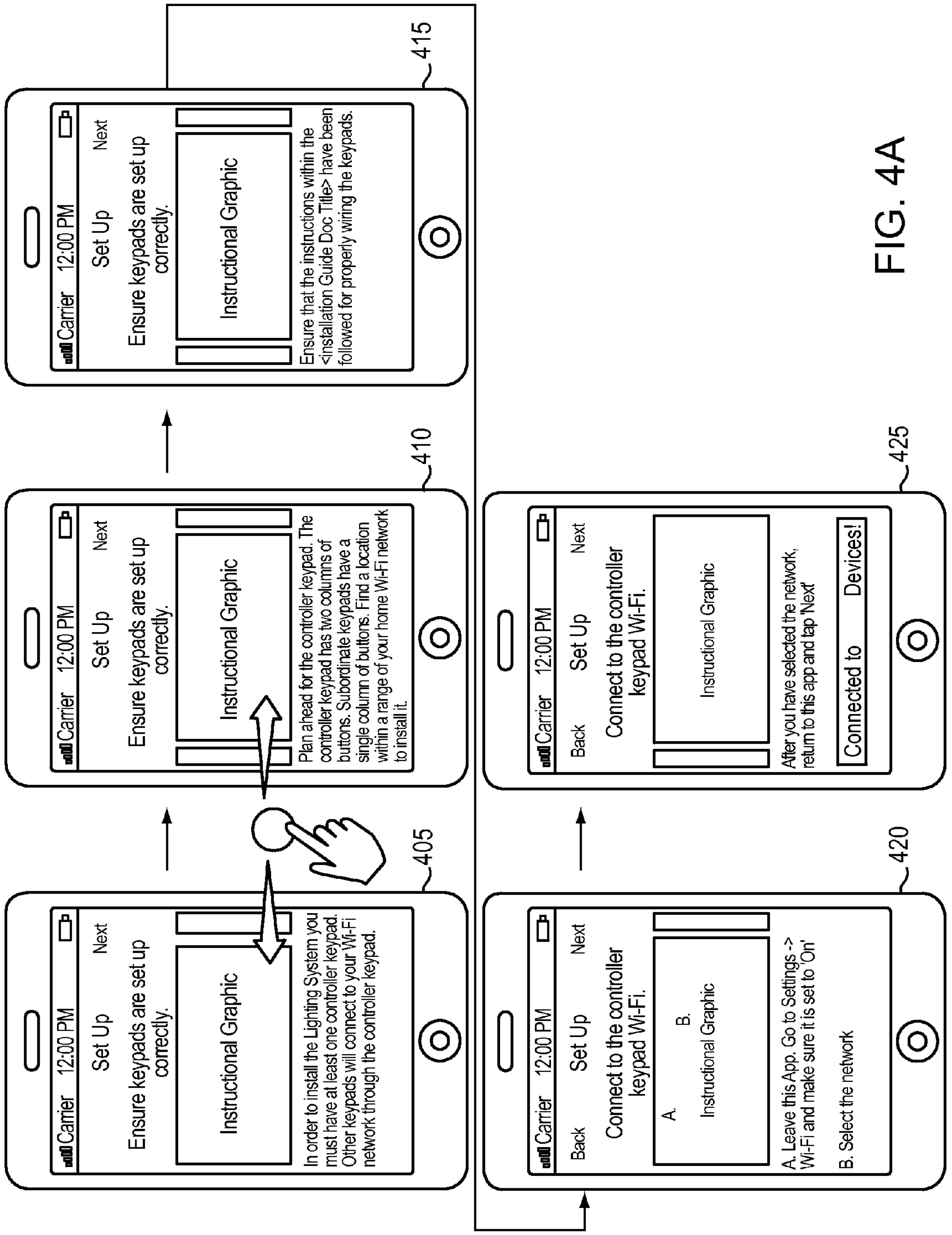
FIGS. 4A-C are a sequence of screen shots of a GUI of an example wireless lighting application (app) shown on a touch sensitive screen of the mobile device, illustrating establishment of a wireless connection.
Figure 4B:
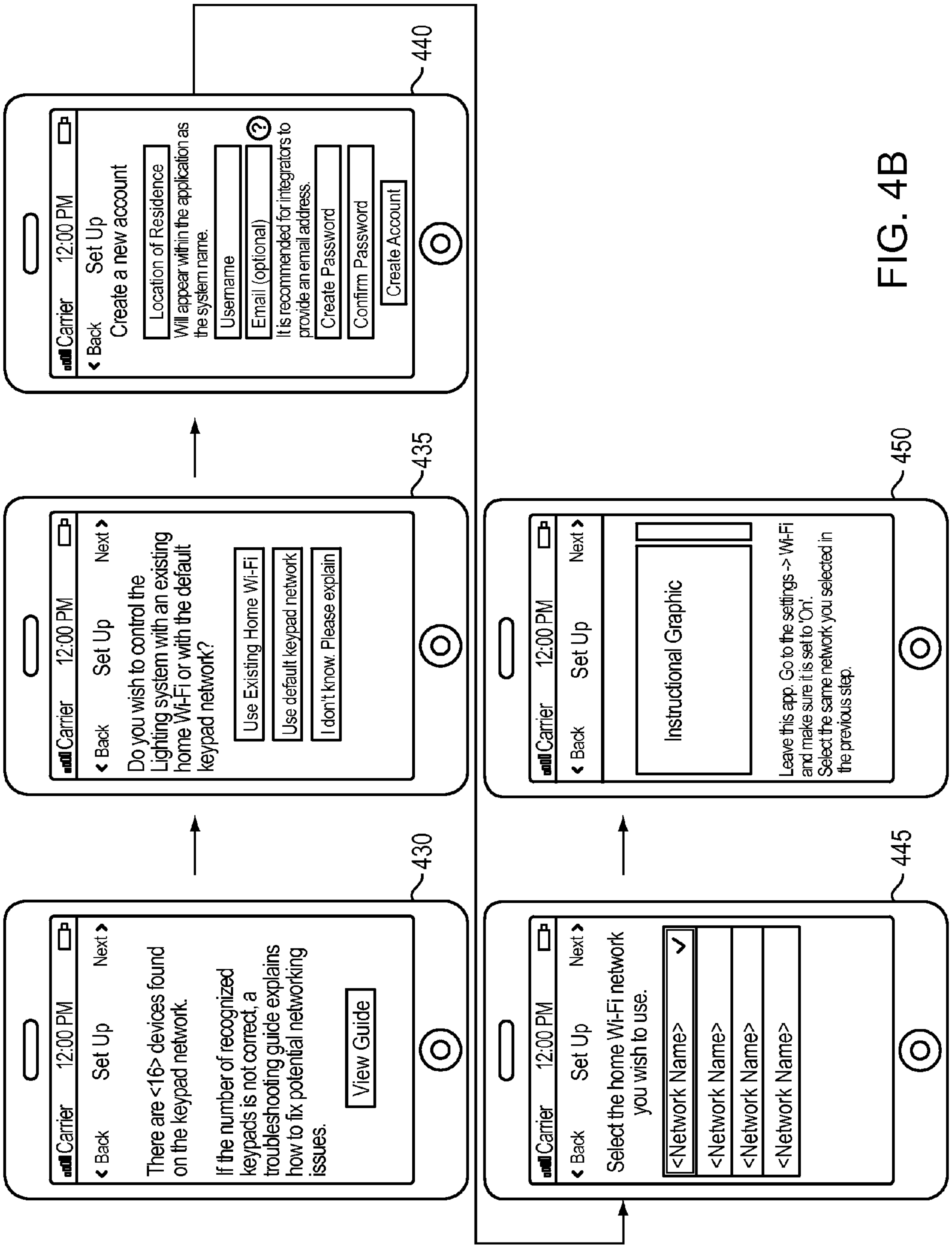
Figure 4C:
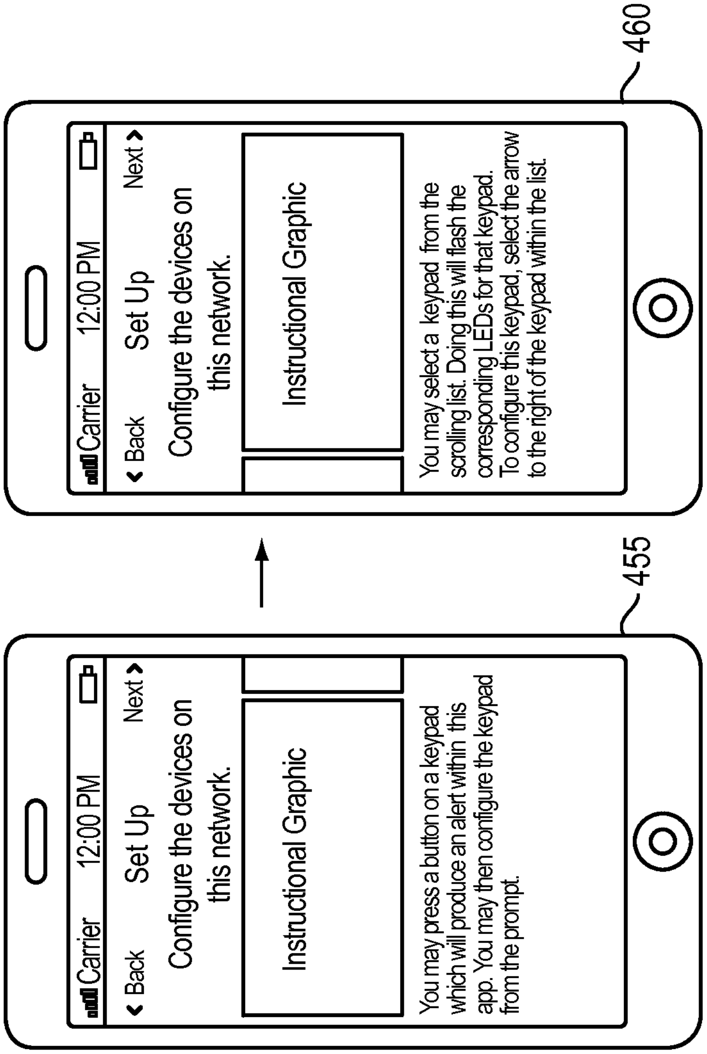

FIGS. 4A-C are a sequence of screen shots of the GUI of the example wireless lighting app 270 shown on the touch sensitive screen 240 of the mobile device 200, illustrating establishment of a wireless connection. In screens 405-415, instructions are displayed explaining how to set up a controller keypad 120 and keypads 130 and/or lamp modules 140. In screens 420-425, instructions are displayed explaining how to connect to the controller keypad and an interface element is provided to initiate the connection The controller keypad may be arranged by default to operate as a Wi-Fi AP. As discussed further below in reference to FIG. 10, an update technique (not shown in FIG. 4A-4C) may be utilized to update en masse each of the Wi-Fi enabled lighting control devices with Wi-Fi settings (e.g., a Service Set Identifier (SSID) and security settings) to operate on the same Wi-Fi network as the controller keypad, for example, to use a network provided by a particular Wi-Fi enabled lighting control device or a separate home Wi-Fi AP 150.

In screen 430, a number of Wi-Fi enabled lighting control devices found is displayed. The number of Wi-Fi enabled lighting control devices is determined by interaction between the controller keypad 130 and the other Wi-Fi enabled lighting control devices operating on the same Wi-Fi network. In screens 435-450, interface elements are provided to switch to a Wi-Fi network provided by a home Wi-Fi AP 150. If such an option is selected, an update technique similar to the one discussed below in reference to FIG. 10 may be utilized to update the Wi-Fi enabled lighting control devices en masse with these new Wi-Fi settings. Still further, in screens 455-460 a user is prompted to select an un-configured Wi-Fi enabled lighting control device. Two alternative methods may be provided. In a first method, a user is prompted to press a programmable button on a Wi-Fi enabled lighting control device and such button press may be conveyed to the wireless lighting app 270 as an alert, thereby selecting the un-configured Wi-Fi enabled lighting control device. Alternatively, in a second method, the user is prompted to select a Wi-Fi enabled lighting control device from a list displayed in the GUI.

Figure 5:
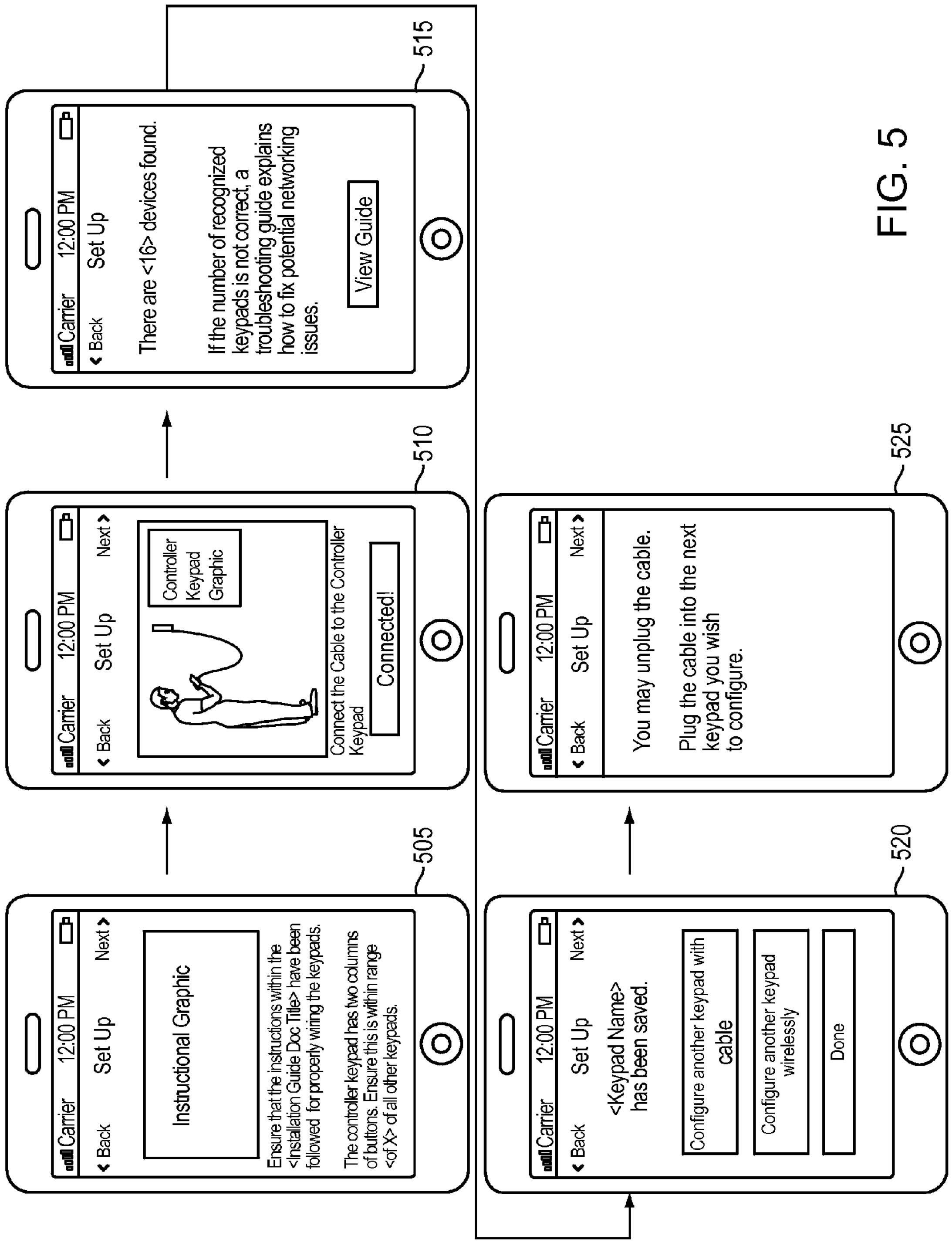
FIG. 5 is a sequence of screen shots of the GUI of the example wireless lighting app shown on the touch sensitive screen of the mobile device, illustrating establishment of a wired connection.

FIG. 5 is a sequence of screen shots of the GUI of the example wireless lighting app 270 shown on the touch sensitive screen 240 of the mobile device 200, illustrating establishment of a wired connection. In screens 505-510, instructions are displayed explaining how to couple the mobile device 200 to a controller keypad 120 using a connection device that couples a serial communication interface of the mobile device 200 to a serial communication interface of the controller keypad 120. An interface element is provided to initiate use of the connection. In screen 515, the number of Wi-Fi enabled lighting control devices is displayed. It is presupposed that by this stage the controller keypad and other Wi-Fi enabled lighting control devices have been updated to utilize the same Wi-Fi settings (e.g., SSID and security settings) so they can communicate with each other on the same network. An update technique similar to the one shown in FIG. 10 may be utilized.

The controller keypad 120 to which the mobile device 200 is initially coupled may be selected for configuration. After its configuration, screens 520-525 are displayed that prompt the user to select another un-configured Wi-Fi enabled lighting control device. Two alternative methods may be provided. In a first method, a user is prompted to establish a wired connection between the mobile device 200 and the un-configured Wi-Fi enabled lighting control device via a connection device. Alternatively, in a second method, the user is prompted to select a Wi-Fi enabled lighting control device wirelessly, similar to as described above in reference to screen 455-460 of FIGS. 4B-4C.

Figure 6:
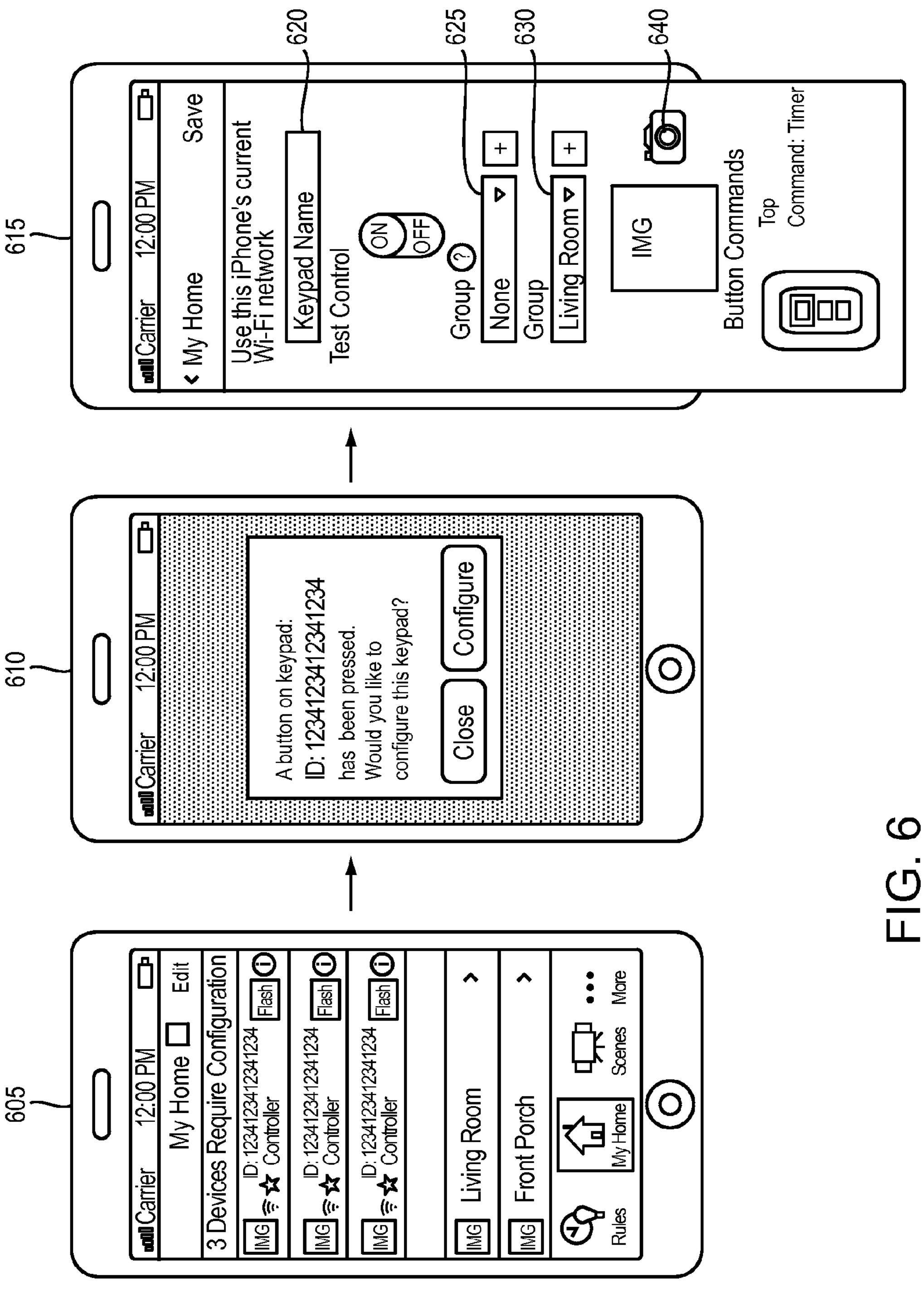
FIG. 6 is a sequence of screen shots of the GUI of the example wireless lighting app shown on the touch sensitive screen of the mobile device, illustrating configuration of a Wi-Fi enabled lighting control device.

FIG. 6 is a sequence of screen shots of the GUI of the example wireless lighting app 270 shown on the touch sensitive screen 240 of the mobile device 200, illustrating configuration of a Wi-Fi enabled lighting control device. While certain differences may exist in configuring different types of Wi-Fi enabled lighting control devices (such as a controller keypads 120 as compared with a keypad 130 or lamp module 140), the sequence of screen shots may be generally representative. In screen 605, a user is prompted to select an un-configured Wi-Fi enabled lighting control device from a listing of un-configured devices. For each un-configured device, an icon may display a type of the device (e.g., controller keypad, keypad, or lamp module). Alternatively, a user may select a Wi-Fi enabled lighting control device by pressing a programmable button on the device. In such case, and the button press may be conveyed to the wireless lighting app 270 as an alert, and as shown in screen 610, the user is prompted to confirm selection of that un-configured Wi-Fi enabled lighting control device. In screen 615, a user is prompted to enter input using an interface element 620 to configure the Wi-Fi enabled lighting control device, by at least associating an attached lighting load with a load name. In the case of a keypad 130 (or lamp module 140) having a single lighting load attached thereto, the load name may take the form of a device name (e.g., a keypad name) for the entire device. In the case of a controller keypad 120 that has multiple lighting loads attached thereto, the load name may take the form of a first load name or a second load name associated with the respective lighting load. As part of the configuration, the user may also enter input using an interface element 625, to assign the lighting load to a group, or via interface element 630, to assign the lighting load to a room. Further, a camera interface element 640 is displayed, using which the user can cause the mobile device to take a picture of the room or group.

Figure 7:
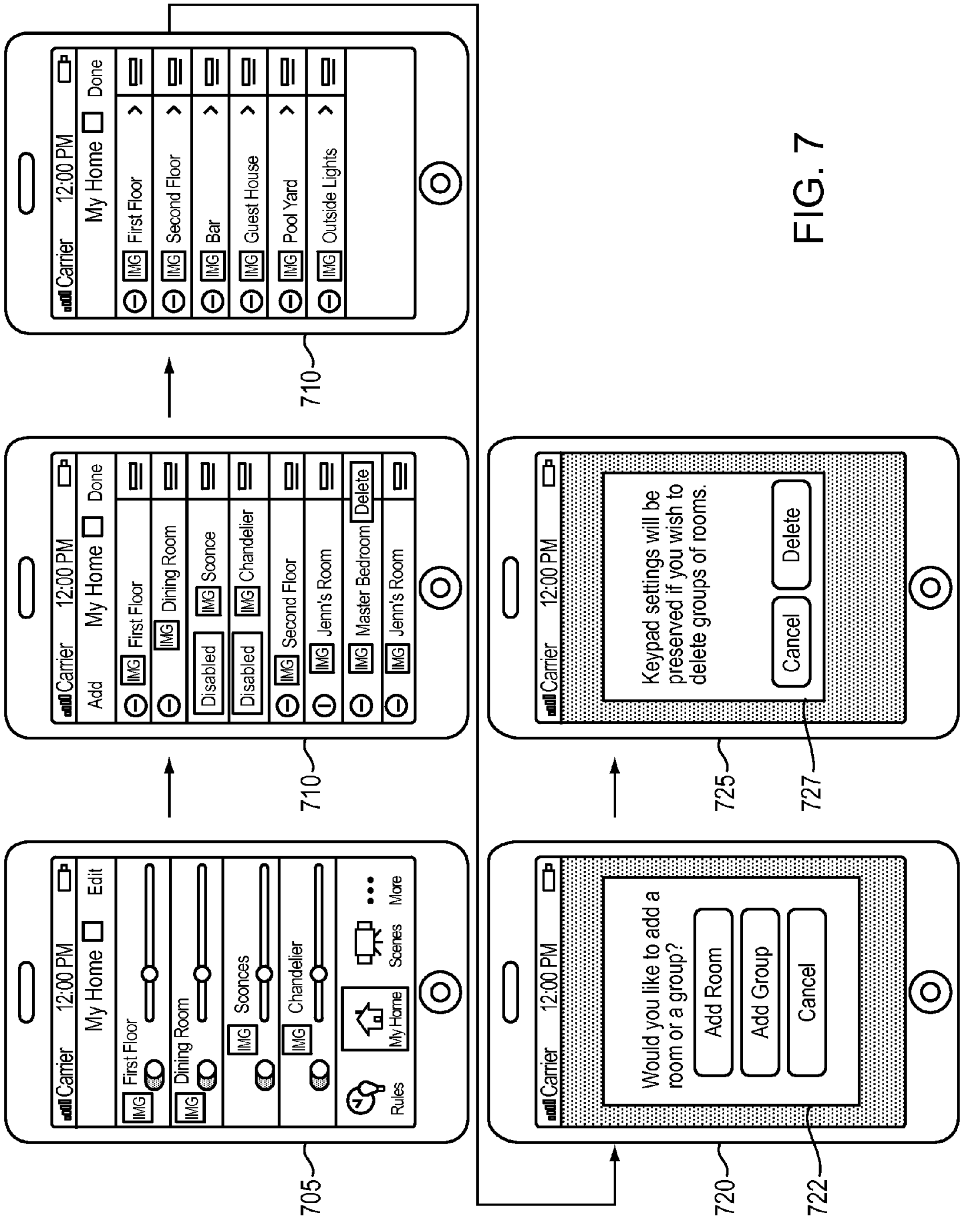
FIG. 7 is a sequence of screen shots of the GUI of the example wireless lighting app shown on the touch sensitive screen of the mobile device, illustrating editing of rooms or groups.

FIG. 7 is a sequence of screen shots of the GUI of the example wireless lighting app 270 shown on the touch sensitive screen 240 of the mobile device 200, illustrating editing of rooms or groups. In screen 705-715, various open and closed views of a hierarchy of groups, rooms and individual lighting loads are shown. For example, in screens 705 and 710, it can be seen that a group named "First Floor" includes a room named "Dining Room", which in turn includes lighting loads named "Sconce" and "Chandelier." In screen 720, a user is presented with interface elements 722 for adding additional rooms and/or groups. Likewise, in screen 725, a user is presented with interface elements 727 for deleting rooms and/or groups.

Figure 8:
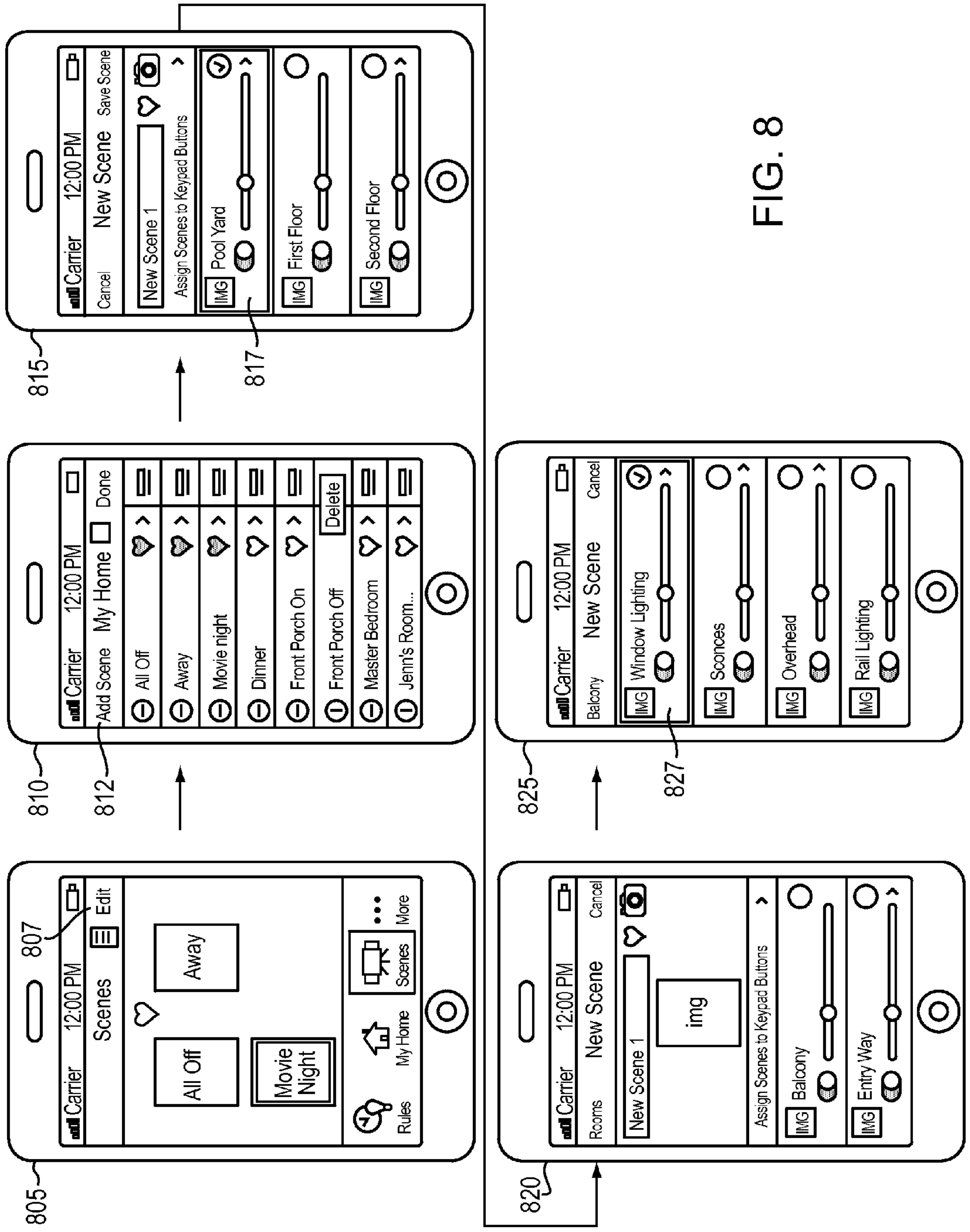
FIG. 8 is a sequence of screen shots of the GUI of the example wireless lighting app shown on the touch sensitive screen of the mobile device, illustrating one way of defining lighting scenes.

FIG. 8 is a sequence of screen shots of the GUI of the example wireless lighting app 270 shown on the touch sensitive screen 240 of the mobile device 200, illustrating one way of defining lighting scenes. In screen 805, existing lighting scenes are shown in a grid view. An interface element 807 is selectable to enable editing of lighting scenes. In screen 810, existing lighting scenes are shown in a list view. An interface element 812 is provided that is selectable to add a new lighting scene. Further interface elements 814 are provided for deleting existing lighting scenes, or altering existing lighting scenes. In screens 815-825, interface elements are provided to assign a name to a new lighting scene, and to assign individual lighting loads, rooms, or groups, set to predefined lighting levels, to the new lighting scene. For example, by selecting an interface element 817 for a "Pool Yard" group in screen 815, and adjusting a lighting level control (e.g., a slider), that group, with its constituent lighting loads set to the selected lighting level, is added to the new lighting scene. Similarly, by selecting an interface element 827 for a "Window Lighting" lighting load in screen 825, and adjusting a lighting level control (e.g., a slider), the individual lighting load, set to the selected lighting level, is added to the new lighting scene.

Figure 9:
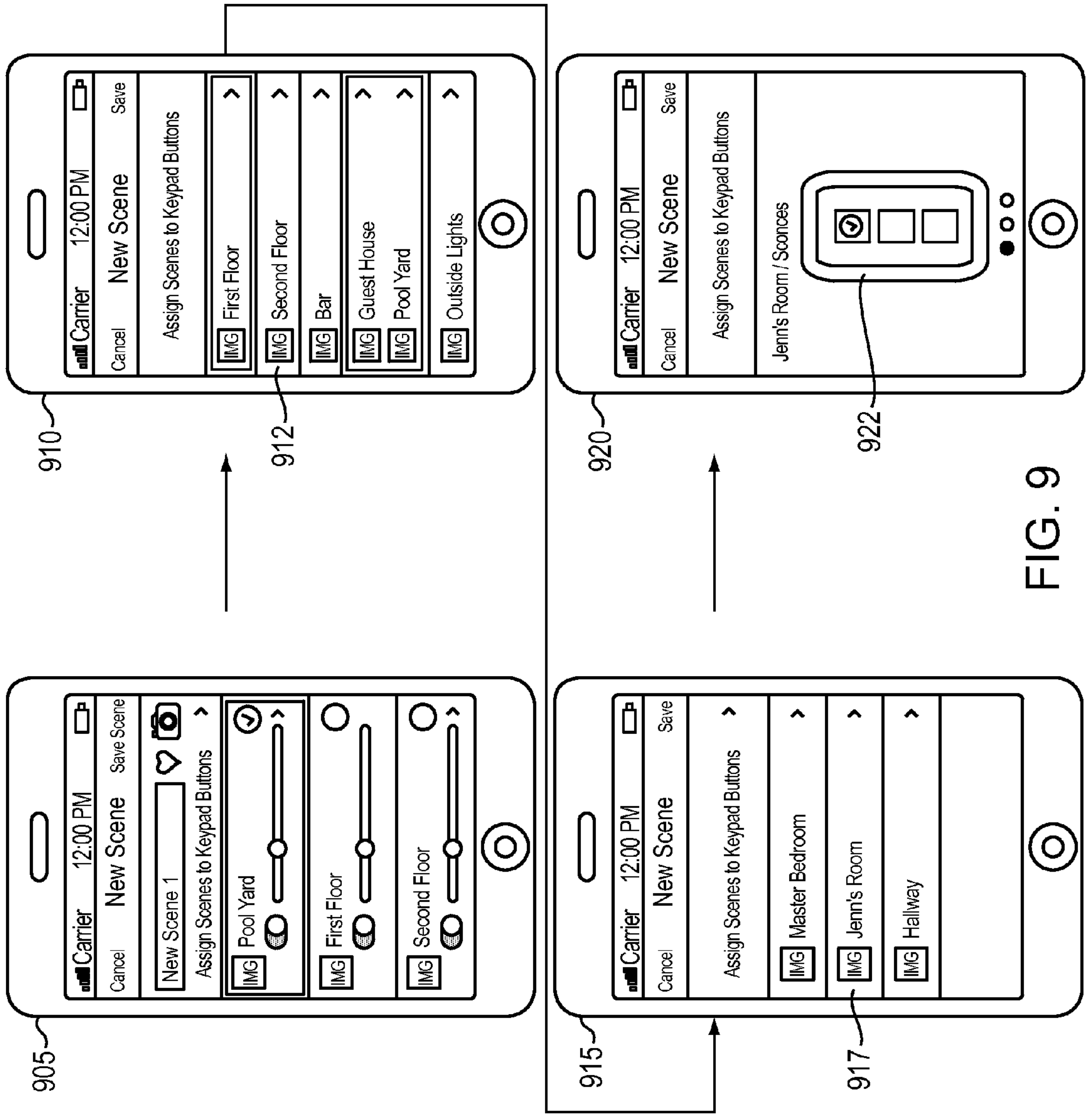
FIG. 9 is a sequence of screen shots of the GUI of the example wireless lighting app shown on the touch sensitive screen of the mobile device, illustrating assignment of a lighting scene to a programmable button of one of the Wi-Fi enabled lighting control.

FIG. 9 is a sequence of screen shots of the GUI of the example wireless lighting app 270 shown on the touch sensitive screen 240 of the mobile device 200, illustrating assignment of a lighting scene to a programmable button of one of the Wi-Fi enabled lighting control devices. In screen 905, interface elements are provided for selecting a lighting scene. For example, the "Pool Yard" lighting scene discussed above in reference to FIG. 8 may be selected. In screens 910-920, interface elements are provided for selecting a programmable button of one the Wi-Fi enabled lighting control devices. The interface elements may be arranged in a hierarchical manner, such that the user first selects a group, for example, a group called "Second Floor" 912, a Wi-Fi enabled lighting control device, for example, a keypad named "Jenn's Room" 917, and an individual programmable button on the Wi-Fi enabled lighting control device, for example, a top button 922. Thereafter, the wireless lighting app 270 may assign the scene to the programmable button (defining the relation in a data structure), such that, upon a press of the button, the Wi-Fi based lighting control system 100 is triggered to produce the lighting effect dictated by the lighting scene.

Wireless Buddy Update Process

As discussed above, it may be desirable to update en masse the wireless settings (e.g., Wi-Fi settings, such as SSID and security settings) of devices of a wireless home automation system, for example, a Wi-Fi based lighting control system. Such update, for example, may cause all (or at least a desired subset of) wireless devices (e.g., Wi-Fi enabled devices) to operate on a newly selected wireless (e.g., Wi-Fi) network.

Considering Wi-Fi enabled lighting control devices as an example, in some implementations, the devices may be set to default (e.g., upon initial startup or reset) to use a common Wi-Fi network, which may serve as a starting point for update. For example, Wi-Fi enabled lighting control devices may be arranged to use a common predetermined SSID and related security settings. Some types of devices (e.g., controller keypads 120) may be arranged to have their Wi-Fi interfaces default to an AP mode, and other types of devices (e.g., keypads 130 and lamp modules 140) may be arranged to have their Wi-Fi interfaces default to a client mode. From this starting point, updated Wi-Fi settings may be "pushed" over the common Wi-Fi network from one Wi-Fi enabled lighting control device (e.g., a controller keypad 130) to the others, by transmission of Wi-Fi parameter messages. For example, in response user input in screens 445-450 of FIG. 4B, the mobile device 200 may set new Wi-Fi settings on a controller keypad 120 that is operating as a Wi-Fi AP, which are then pushed over the common Wi-Fi network to keypads 130 and lamp modules 140 that are operating as clients.

While such a technique may operate well in some implementations, it may prove problematic in other implementations. For example, some commonly utilized Wi-Fi chipsets have limited AP abilities, which permit them to connect to only a limited number of devices operating as clients (e.g., 8 clients). So, for example, if there are several dozen keypads 130 and lamp modules 140 that are operating as clients, they all may be unable to readily connect to a controller keypad 120 that is operating as a Wi-Fi AP if the controller keypad is utilizing a chipset with limited AP abilities.

As such, in some implementations, Wi-Fi enabled lighting control devices may be set to default (e.g., upon initial startup or reset) to use separate Wi-Fi networks, which may serve as a starting point for update. For example, Wi-Fi enabled lighting control devices may each be arranged to have their Wi-Fi interface default to use a unique SSID, and default to operation in an AP mode, such that, at least initially, the number of Wi-Fi networks may equal the number of Wi-Fi enabled lighting control devices. The unique SSID may be generated by concatenation of a standard string (e.g., a standard prefix) with a unique identifier (UID) of the particular Wi-Fi enabled lighting control device, such as the device's media access control (MAC) address or a portion thereof. Use of the standard string in the unique SSID may permit identification of the device as a part of the lighting control system 100. From this starting point, updated Wi-Fi settings may be distributed using "buddy updates". Using such "buddy updates", Wi-Fi settings may propagate from an initial Wi-Fi enabled lighting control device to all (or at least a desired subset of) the Wi-Fi enabled lighting control device through a sequence of successive pair-wise exchanges.

Figure 10:
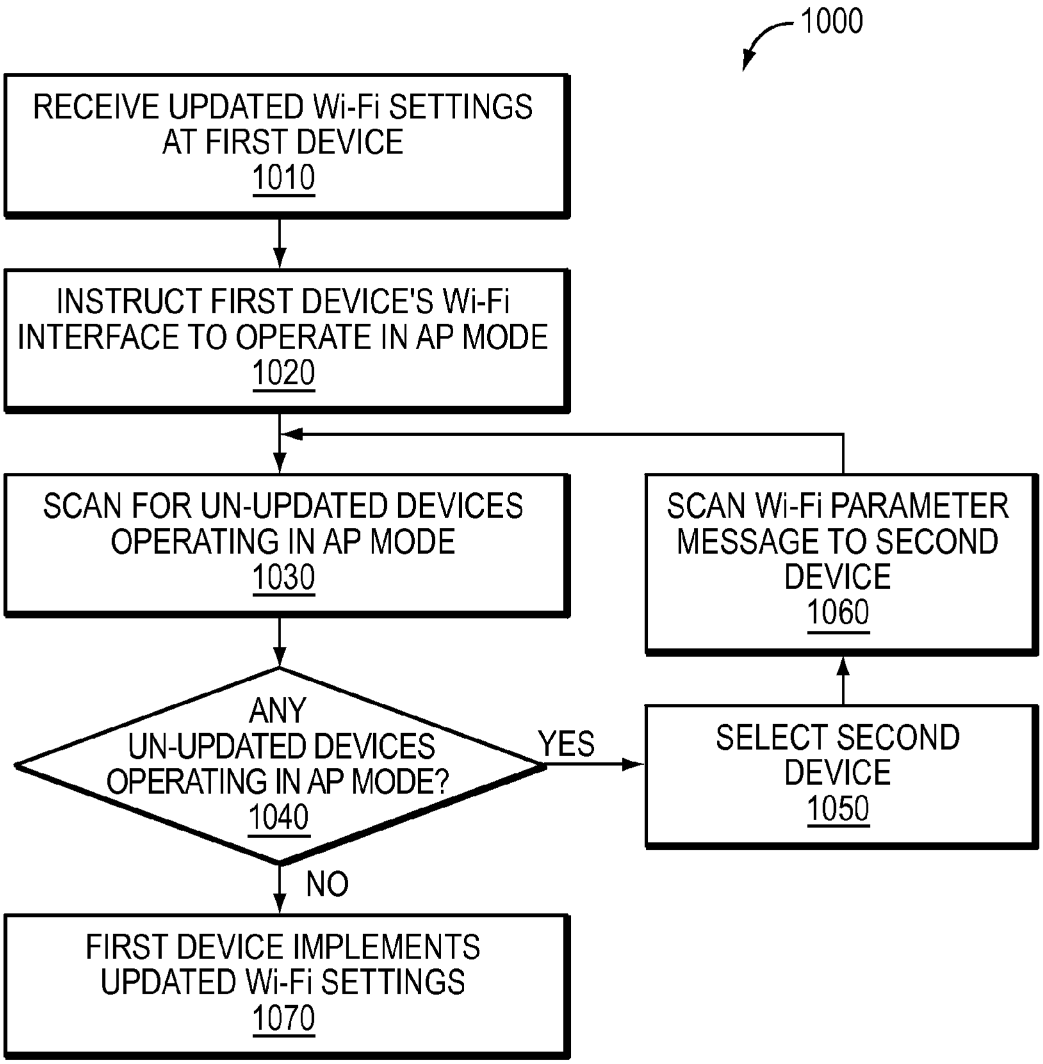
FIG. 10 is a flow diagram of an example sequence of step for propagating updated Wi-Fi settings (e.g., SSID and security settings) en masse to Wi-Fi enabled lighting control devices that may initially be configured to use separate Wi-Fi networks and operate as access points (APs) of such networks.

FIG. 10 is a flow diagram of an example sequence of step 1000 for propagating updated Wi-Fi settings (e.g., SSID and security settings) en masse to Wi-Fi enabled lighting control devices that may initially be configured to use separate Wi-Fi networks and operate as APs of such networks. The sequence of steps 1000 may be executed by a software process running on the first Wi-Fi enabled lighting control device, or divided among processes running on multiple devices. At step 1010, updated Wi-Fi settings (e.g., SSID and security settings) are received at a first Wi-Fi enabled lighting control device. The updated Wi-Fi settings may be received via a connection (e.g., a wireless connection or a wired connection) established to a mobile device 200 executing the wireless lighting app 270, and may represent settings received from a user, for example, via the screens 445-450 shown in FIG. 4B. Alternatively, the Wi-Fi settings may be received from another Wi-Fi enabled lighting control device, for example, via a received Wi-Fi parameters message.

At step 1020, the first Wi-Fi enabled lighting control device instructs its Wi-Fi interface to operate in client mode. At step 1030, the first Wi-Fi enabled lighting control device scans for un-updated Wi-Fi enabled lighting control devices whose Wi-Fi interfaces are operating in AP mode. Wi-Fi enabled lighting control devices may be distinguished from other types of devices by their use of the standard string (e.g., standard prefix) in their SSIDs. At step 1040, the first Wi-Fi enabled lighting control device determines if there are any remaining un-updated Wi-Fi enabled lighting control devices whose Wi-Fi interfaces are operating in AP mode. If there is at least one remaining un-updated Wi-Fi enabled lighting control device whose Wi-Fi interface is operating in AP mode, execution proceeds to step 1050, where the first Wi-Fi enabled lighting control device selects a second Wi-Fi enabled lighting control device from those remaining devices, and attaches as a client to it (e.g., utilizing the device's SSID). At step 1060, the first Wi-Fi enabled lighting control device sends a Wi-Fi parameters message to the second Wi-Fi enabled lighting control device, to instruct it to update its Wi-Fi settings. Thereafter, execution loops back to step 1030. If at step 1040, there are no remaining un-updated Wi-Fi enabled lighting control devices whose Wi-Fi interfaces are operating in AP mode, execution proceeds to step 1070 where the first Wi-Fi enabled lighting control device implements the updated Wi-Fi settings. It should be understood that the sequence of step 1000 may be repeated with each second Wi-Fi enabled lighting control device assuming the role of the first Wi-Fi enabled lighting control device, and propagating the Wi-Fi settings. In such manner, the Wi-Fi settings may propagate pair-wise (e.g., from "buddy" to "buddy") among devices of the Wi-Fi based lighting control system 100, until all (or at least a desired subset of) the devices are updated.

In summary, the above description details example techniques for configuring a wireless home automation system, or, more specifically, a Wi-Fi based lighting control system. It should be understood that various adaptations and modifications may be made within the spirit and scope of the embodiments discussed herein. While many of the examples discussed involve Wi-Fi based lighting control, it should be understood that many of the techniques are in no way limited to Wi-Fi or to lighting control, and may be used with various other types of wireless technology, and various other types of home automation systems, including systems incapable of affecting illumination. While reference is made to a controller keypad 120, keypads 130 and lamp modules 140, it should be understood that other types of controllers, user-interface devices, and device control modules may be readily substituted. Likewise, a controller keypad 120, keypads 130 and lamp modules 140 may be adapted to switch or otherwise control other types of "loads". The "loads" may represent electrical or electronic devices that, when activated, perform a function about a structure. For example, a "load" may be an electronic window blind on a window of the structure. Likewise, a "load" may be an electronic door lock of a door within the structure. As such, the techniques discussed herein may be applicable to a variety of types of home automation systems that may control things other than lighting.

Further, it should be understood that at least some portions of the above-described techniques may be implemented in software, in hardware, or a combination thereof. A software implementation may include machine-executable instructions (e.g., computer-executable instructions) stored in a non-transitory machine-readable medium (e.g., a non-transitory computer-readable medium), such as a volatile or persistent memory, a hard-disk, a compact disk (CD), or other tangible medium. A hardware implementation may include configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors, memories, etc. Accordingly, it should be understood that the above descriptions are meant to be taken only by way of example.

What is claimed is:

1. A method for configuring a wireless lighting control system including a plurality of wireless lighting control devices from a mobile device, comprising:

executing a wireless lighting application (app) on the mobile device;

establishing, by the mobile device, a connection to a wireless lighting control device of the plurality of wireless lighting control devices separate from the mobile device;

in response to user input in a graphical user interface (GUI) of the wireless lighting app on the mobile device, configuring the plurality of wireless lighting control devices to operate on a same wireless network as the connected wireless lighting control device, the plurality of wireless lighting control devices each initially utilizing unique wireless settings of different wireless networks and operating in an access point (AP) mode on their respective different wireless network, the configuring including propagating updated wireless settings pair-wise among the plurality of wireless lighting control devices by having an updated wireless lighting control device with the updated wireless settings attach to an un-updated wireless lighting control device as a client and send a parameter message including the updated wireless settings thereto;

in response to a first user input in the GUI of the wireless lighting app on the mobile device, defining a lighting scene by the wireless lighting app on the mobile device, the lighting scene to represent a predefined lighting effect produced by a plurality of user-selected lighting loads set at user-selected lighting levels; and in response to a second user input in the GUI of the wireless lighting app on the mobile device, assigning, by the wireless lighting app on the mobile device, the lighting scene to a programmable button of one of the plurality of wireless lighting control devices such that, in response to a press of the programmable button, the wireless lighting control system produces the predefined lighting effect.

2. The method of claim 1, wherein the plurality of wireless lighting control devices include a lighting controller and a plurality of keypads and/or lamp modules, and the method further comprises:

in response to a third user input in the GUI of the wireless lighting app on the mobile device, configuring, by the wireless lighting app on the mobile device, at least one of the lighting controller, the plurality of keypads or the lamp modules by at least associating an attached lighting load with a load name.

3. The method of claim 2, wherein the lighting controller is a controller keypad that includes dimming and/or switching circuitry operable to dim and/or switch a plurality of attached lighting loads coupled thereto via in-wall wiring, and includes a plurality of programmable buttons.

4. The method of claim 3, wherein the controller keypad has a form factor that fits within a 2-gang in-wall electrical box.

5. The method of claim 2, wherein the plurality of keypads each include dimming and/or switching circuitry operable to dim and/or switch an attached lighting load coupled thereto via in-wall wiring, and each include a plurality of programmable buttons.

6. The method of claim 5, wherein the plurality of keypads each have a form factor that fits within a 1-gang in-wall electrical box.

7. The method of claim 2, wherein the lamp modules each include dimming and/or switching circuitry operable to dim and/or switch an attached lighting load coupled thereto via an electrical cord plugged into a lamp-facing outlet.

8. The method of claim 7, wherein at least one of the lamp modules is coupled to a table top keypad that includes a plurality of programmable buttons.

9. The method of claim 1, wherein the connection is a wireless connection over a Wi-Fi network.

10. The method of claim 1, wherein the connection is a wired connection that utilizes a connection device to couple a serial communication interface of the mobile device to a serial communication interface of the wireless lighting control device.

11. The method of claim 2, wherein the configuring further comprises:

organizing the attached lighting load with one or more other lighting loads to form a room and/or a group.

12. The method of claim 10, wherein the defining a lighting scene comprising:

associating the room or the group with a selected lighting level.

13. The method of claim 1, further comprising:

in response to a third user input in the GUI, signaling, by the wireless lighting app on the mobile device, the wireless lighting control system to control one or more individual lighting loads, rooms, groups or lighting scenes.

14. The method of claim 1, wherein the mobile device is a smartphone or tablet computer.

15. A wireless lighting control system including a plurality of wireless lighting control devices configurable from a mobile device, comprising:

a lighting controller of the plurality of wireless lighting control devices;

a plurality of keypads of the plurality of wireless lighting control devices in communication with the lighting controller via wireless signals, each of the plurality of keypads including dimming and/or switching circuitry operable to dim and/or switch an attached lighting load, and one or more programmable buttons, each of the plurality of keypads configured by default to utilize unique wireless settings of different wireless networks and operate in an access point (AP) mode on their respective different wireless network; and a wireless lighting application (app) executable on the mobile device separate from the plurality of wireless lighting control devices, the wireless lighting app when executed to conduct operations to:

in response to a first user input in a graphical user interface (GUI) displayed on the mobile device, configure at least one of the plurality of keypads by providing updated wireless settings for a wireless network to be used by the at least one of the plurality of keypads and at least associating the attached lighting load with a load name, in response to a second user input in the GUI, define a lighting scene that uses the attached lighting load having the load name, the lighting scene to represent a predefined lighting effect produced by a plurality of user-selected lighting loads set at user-selected lighting levels, and in response to a third user input in the GUI, assign the lighting scene to a programmable button of the at least one of the plurality of keypads that is separate from the mobile device such that, in response to a press of the programmable button, the wireless lighting control system produces the predefined lighting effect, wherein the at least one of the plurality of keypads is configured to propagate the updated wireless settings to one or more un-updated keypads by attaching to each un-updated keypad as a client and sending a parameter message including the updated wireless settings thereto.

16. The wireless lighting control system of claim 15, wherein the lighting controller is a controller keypad that includes additional dimming and/or switching circuitry operable to dim and/or switch a plurality of attached lighting loads coupled thereto via in-wall wiring, and includes a plurality of programmable buttons, wherein the controller keypad has a form factor that fits within a 2-gang in-wall electrical box.

17. The wireless lighting control system of claim 15, wherein the dimming and/or switching circuitry included in each of the keypads that is operable to dim and/or switch the attached lighting load is coupled to the attached lighting load via in-wall wiring, and the keypads each include a plurality of programmable buttons, wherein the keypads each have a form factor that fits within a 1-gang in-wall electrical box.

18. The wireless lighting control system of claim 15, further comprising:

a connection device operable to couple a serial communication interface of the mobile device to a serial communication interface of the at least one of the plurality of keypads, and over which signals are sent to conduct the operations to configure the at least one of the plurality of keypads, define the lighting scene and assign the lighting scene to the programmable button.

19. A method for updating wireless settings in a wireless home automation system including a plurality of wireless devices, comprising:

setting a wireless interface of each wireless device of the plurality of wireless devices to utilize unique wireless settings and to operate in an access point (AP) mode;

receiving updated wireless settings at a first wireless device of the plurality of wireless devices from a mobile device operated by a user, the updated wireless settings to be used by the first wireless device; and in response to receiving the updated wireless settings to be used by the first wireless device, initiating an update process that includes:

changing the wireless interface of the first wireless device to operate in a client mode, scanning for any un-updated wireless devices whose wireless interface is operating in the AP mode;

when there is at least one un-updated wireless device whose wireless interface is operating in the AP mode, attaching as a client, by the first wireless device, to a second wireless device selected from the at least one un-updated wireless device;

sending, by the first wireless device, a parameter message to the second wireless device including the updated wireless settings; and repeating the scanning, selecting and sending until there are no un-updated wireless devices whose wireless interface is operating in the AP mode.

20. The method of claim 19, wherein the wireless home automation system is a Wi-Fi based home automation system, the wireless interface is a Wi-Fi interface, each wireless device is a Wi-Fi enabled device, and the unique wireless settings and updated wireless settings are unique Wi-Fi settings and updated Wi-Fi settings, respectively.

21. The method of claim 20, wherein the unique Wi-Fi settings include a unique Service Set Identifier (SSID), such that each Wi-Fi enabled device serves as an AP of a Wi-Fi network having a different SSID.

22. The method of claim 21, further comprising:

generating the unique SSID of a respective Wi-Fi enabled device by concatenating a standard string to a Media Access Control (MAC) address of the respective Wi-Fi enabled device.

23. The method of claim 19, wherein the setting the wireless interface is performed as a default operation upon initial startup or reset of a respective wireless device.

24. The method of claim 19, wherein the updated wireless settings represent input by the user into an application (app) executing on the mobile device.

25. The method of claim 19, wherein the receiving further comprises:

receiving the updated wireless settings from another wireless device in a parameter message.

26. The method of claim 19, wherein the plurality of wireless devices are a plurality of wireless lighting control devices that each include dimming and/or switching circuitry operable to dim and/or switch an attached lighting load.

27. A wireless home automation system including a plurality of wireless devices, comprising:

a first wireless device of the plurality of wireless devices having a wireless interface configured to utilize by default first unique wireless settings and to operate by default in an access point (AP) mode;

a second wireless device of the plurality of wireless devices having a wireless interface configured to utilize by default second unique wireless settings and to operate by default in the AP mode; and a first software process executing on the first wireless device and configured, in response to receipt of updated wireless settings to be used by the first wireless device from a mobile device operated by a user, to:

change the wireless interface of the first wireless device to operate in a client mode, scan, using the wireless interface of the first wireless device, for any un-updated wireless devices whose wireless interface is operating in the AP mode, select the second wireless device as an un-updated wireless device whose wireless interface is operating in the AP mode, attach as a client to the second wireless device, and send, via the wireless interface of the first wireless device, a wireless parameter message to the second wireless device including the updated wireless settings.

28. The wireless home automation system of claim 27, further comprising:

a third wireless device of the plurality of wireless devices having a wireless interface configured to utilize by default third unique wireless settings and to operate by default in the AP mode; and a second software process executing on the second wireless device and configured, in response to receipt of the updated wireless settings, to:

change the wireless interface of the second wireless device to operate in the client mode, scan, using the wireless interface of the second wireless device, for any un-updated wireless devices whose wireless interface is operating in the AP mode, select the third wireless device as an un-updated wireless device whose wireless interface is operating in the AP mode, attach as a client to the third wireless device, and send, via the wireless interface of the second wireless enabled device, a parameter message to the third wireless device including the updated wireless settings.

29. A non-transitory machine-readable medium having instruction stored thereon, the instructions including instructions for a software process that when executed by a first wireless device of a home automation system that is initially operating in an access point (AP) mode are operable to:

receive updated wireless settings for the first wireless device of the home automation system; and in response to the updated wireless settings, initiate an update process that includes:

changing a wireless interface of the first wireless device of the home automation system to operate in a client mode, scanning for any un-updated wireless devices of the home automation system whose wireless interface is operating in the AP mode;

when there is at least one un-updated wireless device whose wireless interface is operating in the AP mode, attaching as a client, to a second wireless device selected from the at least one un-updated wireless device, and sending a parameter message to the second wireless device including the updated wireless settings.

30. The non-transitory machine-readable medium of claim 29, wherein the home automation system is a Wi-Fi based home automation system, the wireless interface is a Wi-Fi interface, and the updated wireless settings are updated Wi-Fi settings.

31. The non-transitory machine-readable medium of claim 30, wherein the updated Wi-Fi settings include an updated Service Set Identifier (SSID).

32. The non-transitory machine-readable medium of claim 29, wherein the plurality of wireless devices of the home automation system are a plurality of wireless lighting control devices of the home automation system that each include dimming and/or switching circuitry operable to dim and/or switch an attached lighting load.

* * * * *